United States Patent Office 3,584,026
Patented June 8, 1971

---

3,584,026
CYANOALKOXYALKENYL AND AMINOALKOXY-ALKENYLSILANES
Abe Berger and Terry G. Selin, Schenectady, N.Y., assignors to General Electric Company
No Drawing. Filed July 17, 1968, Ser. No. 745,408
Int. Cl. C07f 7/02, 7/04
U.S. Cl. 260—448.2
12 Claims

ABSTRACT OF THE DISCLOSURE

A compound within the scope of the formula:

(1) 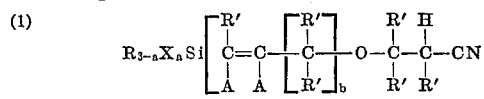

is made by reacting $R_{3-a}X_aSiH$ with

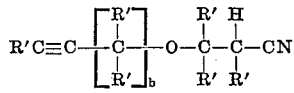

A compound within the scope of the formula:

(2) 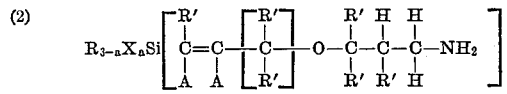

is made by hydrogenating the corresponding nitrile. In the above formulas, A is SiC bond or a hydrogen radical, A is a monovalent organic radical, R' is a monovalent organic radical or hydrogen, X is a hydrolyzable group, $a$ has a value of 0 to 3, and $b$ has a value of one to 4. Compounds (1) and (2) are useful in detergent resistant polish compositions.

---

This invention relates to organosilicon compounds containing organic radicals, hydrolyzable groups and cyanoalkoxyalkenyl or aminoalkoxyalkenyl radicals attached to silicon and to the use of such compounds.

Silanes containing cyanoalkoxyalkyl radicals and aminoalkoxyalkyl radicals are known in the art. These materials are difficult to prepare, expensive, and unstable. In addition, by-products produced in the synthesis of these prior art silanes, which by-produts can be removed only with the greatest difficulty, tend to mask the desirable properties of these silanes.

In spite of the existence of these prior art silanes problems continued to exist in the field of detergent resistant polishes, slip -resistant polishes, non-wicking silicon furniture polish, water repellency of cloth, and room temperature vulcanizable silicon compositions which cure to a tough, completely transparent film rapidly without the formation of corrosive by-products. These problems have now been solved by the compositions of the present invention.

When the amine-containing compounds of the present invention are incorporated into polysiloxanes used in polish compositions, the result is improved detergent resistancy, improved rub-out over what is achieved without the presence of the amine-containing compounds, and improved gloss. The amine-containing compounds are also useful in textile treating compositions. Textiles treated with such compositions unexpectedly become more water repellent after washing than they were before. The reaction product of the amine-containing compounds of the present invention and silanol-containing silicon fluids cure exceptionally fast when exposed to atmospheric moisture. This reaction is the basis for an entirely new type of room temperature vulcanizable adhesive.

The cyanoalkoxyalkenylsilanes can be hydrogenated to aminoalkoxyalkylsilanes. This route to the aminoalkoxyalkylsilanes is substantially superior to the prior art methods of arriving at these compounds in that amount of impurity formed in the reaction, which substantially interferes with the properties of these compounds, is reduced, if not eliminated entirely. The aminoalkoxyalkenylsilanes and cyanoalkoxyalkenylsilanes of the present invention are also useful as glass sizing agents and as inorganic filler treating agents.

This invention is concerned with cyanoalkoxyalkenyl and aminoalkoxyalkenyl silicon compounds of the formula:

(1) 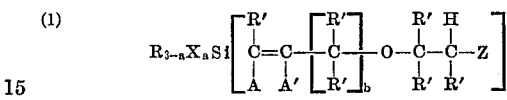

In this above formula and in the formulas that follow, A is the SiC bond or a hydrogen radical, A' is the SiC bond or a hydrogen radical, Z is a CN or a

radical, R is a monovalent organic radical, R' is a monovalent organic radical or hydrogen, X is a hydrolyzable group, $a$ has a value of 0 to 3, and $b$ has a value of 1 to 4.

More specifically, R is a radical selected from the class consisting of lower alkyl radicals, methyl, ethyl, propyl, butyl, octyl, radicals; cycloalkyl radicals having 5 to 7 carbon atoms in the ring, cyclopentyl cyclohexyl, cycloheptyl, radicals; mononuclear and binuclear aryl radicals, phenyl naphthyl, biphenyl, radicals; mononuclear aryl lower alkyl radicals, benzyl, tolyl, xylyl, phenylethyl, radicals; and when Z is CN, R can also be a halogenated derivative of the aforementioned radicals, chloromethyl, chlorophenyl, dibromophenyl, radicals; R' is a radical selected from the class consisting of lower alkyl radicals, methyl, ethyl, propl, butyl, pentyl, heptyl, radicals; cycloalkyl radicals having 5 to 7 carbon atoms in the ring, cyclopentyl, cyclohexyl, cycloheptyl, radicals; mononuclear and binuclear aryl radicals, phenyl, naphthyl, biphenyl, radicals; mononuclear aryl lower alkyl radicals, benzyl, tolyl, xylyl, phenylethyl, radicals; further radicals were two R' radicals attached to the same carbon atom, taken together with the carbon atom to which they are attached form a cycloalkyl radical having 5 to 7 carbon atoms in the ring, cyclopentyl, cyclohexyl, cycloheptyl, radicals; and hydrogen; and when Z is CN, R' in addition to the aforementioned radicals can be selected from the class consisting of halogenated derivatives of the aforementioned radicals, chloromethyl, chlorophenyl, dibromophenyl, radicals; X is a hydrolyzable radical selected from the class consisting of lower alkoxy radicals, methoxy, ethoxy, propoxy, radicals; mononuclear aryloxy radicals, phenoxy radicals; lower dialkylamino radicals, dimethylamino, diethylamino, dipentylamino, radicals; and lower dialkylaminoxy radicals, dimethylaminoxy, dihexylaminoxy, radicals. When Z is CN, X, in addition to the above radicals, can also be halide radicals, fluoride, chloride or bromide radicals; isothiocyanato radicals; isonitrile radicals; oximo radicals; mercapto lower alkyl radicals, methylmercapto, octylmercapto, radicals; lower acryloxy radicals, acetoxy radicals and lower dialkylphosphino radicals, dimethylphosphino, diisobutylphospheno, diisoheptylphosphino, radicals. The prefix "lower" used above modifying radicals, indicates that the alkyl groups contained on the radicals each have 8 or fewer carbon atoms.

Cyanoalkoxyalkenylsilanes and aminoalkoxyalkenylsilanes within the scope of the present invention include, for example, compounds represented by the following formulas:

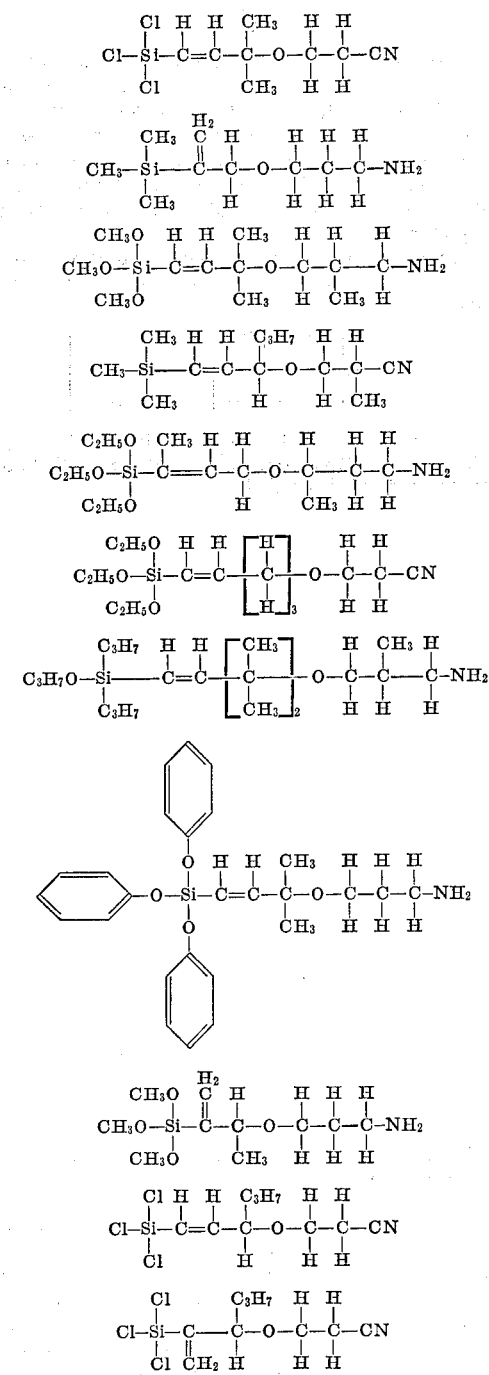

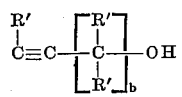

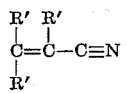

The compounds of the present invention can be prepared by a number of different methods. The method chosen is determined to a large extent by the end-product desired.

The usual method used for preparing a compound within the scope of the present invention containing a nitrile group or a primary amine group is as follows:

An acetylenic alcohol within the scope of the formula:

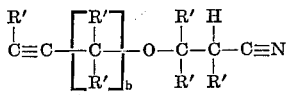

is reacted with a nitrile within the scope of the formula:

$$\begin{array}{c} R' \; R' \\ | \; | \\ C=C-C\equiv N \\ | \\ R' \end{array}$$

in the presence of a basic catalyst to produce an acetylenic nitrile within the scope of the formula:

$$C\equiv C-\left[\begin{array}{c}R'\\|\\C\\|\\R'\end{array}\right]_b-O-\begin{array}{c}R'\\|\\C\\|\\R'\end{array}-\begin{array}{c}H\\|\\C\\|\\R'\end{array}-C\equiv N$$

When a tertiary alkynol is reacted, the basic catalyst used in the reaction is preferably sodium methoxide. When a primary alkynol is reacted, a polystyrene supported quaternary ammonium base is preferred. However, in either case other strong base catalysts may also be used, such as other alkali metal alkoxides, alkali metal hydroxides, solubilized quaternary ammonium hydroxides.

Examples of alkynols which can be employed in the above described reaction include those of the following formulas:

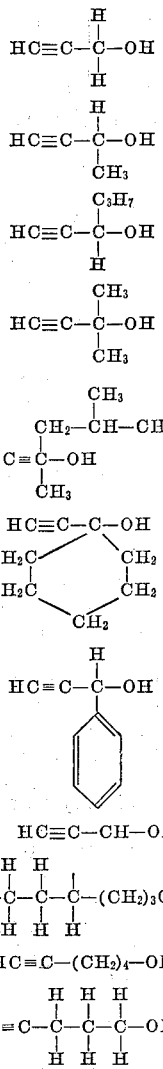

Examples of nitriles which can be employed in the cyanoethylation type reaction include those having the following formulas:

$$CH_2=CH-CN$$

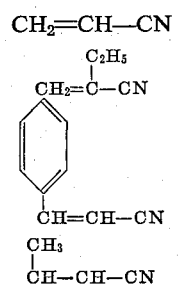

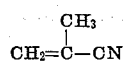

The acetylenic nitrile is then reacted with a silane within the scope of the formula:

in the presence of a platinum compound catalyst to produce a cyanoalkoxyalkenylsilane of the formula:

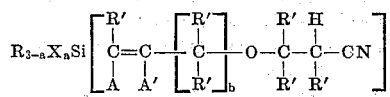

The platinum compound catalyst can be selected from that group of platinum compound catalysts which are operative to catalyze the addition of silicon-hydrogen bonds across olefinic bonds.

Among the many useful catalysts for this addition reaction are chloroplatinic acid as described in U.S. Pat. 2,823,218, Speier et al., the reaction product of chloroplatinic acid with either an alcohol, an ether or an aldehyde as described in U.S. Pat. 3,220,972, Lamoreaux, trimethylplatinum iodide and hexamethyldiplatinum as described in U.S. Pat. 3,313,772, Lamoreaux, the platinum olefin complex catalysts as described in U.S. Pats. 3,159,601 of Ashby and the platinum cyclopropane complex catalyst as described in U.S. Pat. 3,159,662 of Ashby.

The SiH-olefin addition reaction may be run at room temperature or at temperatures up to 200° C., depending upon catalyst concentration. The catalyst concentration can vary from $10^{-7}$ to $10^{-3}$ and preferably $10^{-5}$ to $10^{-4}$ moles of platinum as metal per mole of acetylene containing-molecules present.

When the cyanoalkoxyalkenylsilane contains halide radicals as the hydrolyzable groups, these groups may be replaced with alkoxy groups. The alkoxylation can be accomplished by reacting the cyanoalkoxyalkenylsilane containing hydrolyzable silicon-bonded halide radicals with a non-acid forming material such as a lower alkyl orthoformate, preferably methyl orthoformate.

After the alkoxy derivative is formed from the corresponding halide-containing material or directly as the case may be, the nitrile radical is converted to an amine radical by hydrogenation. The hydrogenation is conducted at from 20 to 4000 p.s.i. at 30° to 150° C. in the presence of a hydrogenation catalyst, such as nickel or cobalt.

The preferred conditions for the hydrogenation are a pressure of 20 to 100 p.s.i., a temperature of 30° to 120° C., and the presence of a Raney nickel catalyst. The catalyst preferably contains no acidic impurities, as these interfere with the reaction and cause the formation of undesirable by-products.

It was quite unexpected that the hydrogenation could be accomplished at 20 to 100 p.s.i., as the usual pressure conditions for this type of reaction are generally in the range of 1000 to 2000 p.s.i. The hydrogenation step is represented by the following general equation. The nitrile radical is easily hydrogenated to the exclusion of the olefinic double bond.

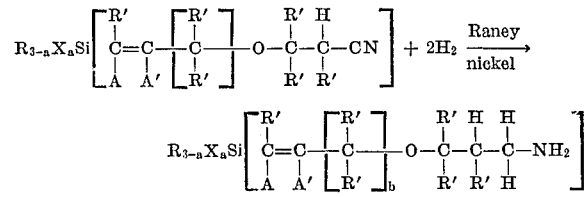

The following examples are illustrative of the compounds prepared according to the practice of our invention and are not intended for purposes of limitation. All parts unless otherwise indicated are by weight.

The catalyst solution which was used in the SiH-acetylene addition reactions in the following examples was a platinum coordinate catalyst solution formed by the reaction of chloroplatinic acid and octyl alcohol. The preparation of the catalyst solution is disclosed in Example 1 of U.S. Pat. 3,220,972 of Lamoreaux. Chemical analysis of this solution showed it to contain 3.5 atoms of chlorine per atom of platinum and 0.035 gram of platinum per gram of solution.

EXAMPLE 1

To a small one-necked flask containing a solution of 84 parts of 3-methyl-1-butyn-3-ol and 53 parts of acrylonitrile was added one part of solid (powdered) sodium methylate. The mixture was stirred at 22°–25° C. by means of magnetic stirrer. After a reaction time of 18 hours, gas chromatographic analysis indicated that the reaction was essentially complete. To the mixture was added 5 parts of trimethylchlorosilane to destroy the catalyst. After filtering the reaction mixture to remove the solids present (mostly NaCl), the clear, pale-orange filtrate was fractionally distilled under vacuum. There was obtained 115 parts (84% of theory) of the desired beta-(dimethylpropargyloxy)propionitrile, boiling at 57°–61°/1.3 mm. Hg ($n_D^{25}$ 1.4328). Gas chromatography indicated a purity of greater than 99%.

Into a three-necked flask equipped with a magnetic stirrer, reflux condenser, thermometer, and addition funnel were placed 96 parts of beta-(dimethylpropargyloxy)propiontrile and one part of the platinum coordinate catalyst solution. To the addition funnel was charged 171 parts of trimethoxysilane. The acetylenic compound containing the catalyst was heated and stirred. When the temperature reached 110° C., 25 parts of trimethoxysilane was added dropwise. A mild exothermic reaction set in. When the temperature reached 125° C., a very rapid reaction caused vigorous refluxing (210° C. pot temperature). After cooling, the reaction mixture was heated at reflux until the reaction temperature rose to 125° C. and the remainder of the trimethoxysilane was added slowly while maintaining a reflux temperature of 125°–130° C. Continued heating resulted in a second vigorous exotherm. Analysis following the exotherm indicated that all of the beta-(dimethylpropargyloxy)propionitrile had reacted. The reaction mixture was transferred to a distillation flask and the reaction mixture was fractionally distilled at a reduced pressure. There was obtained 81 parts of material boiling at 108°–112° C./1.1 mm. Hg. The infrared spectrum of this product was consistent with the expected structure, i.e., 3-methyl-3-(2-cyanoethoxy)-1-trimethoxysilylbutene-1 of the formula:

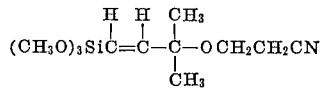

An elemental analysis of the product is set forth in the following table.

Calculated (percent): C, 50.93; H, 8.16; N, 5.40; Si, 10.83. Found (percent): C, 51.23; H, 8.13; N, 5.40; Si, 10.81.

EXAMPLE 2

Into a pressure bottle was placed 81 parts of 3-methyl-3-(2-cyanoethoxy)-1-trimethoxysilylbutene-1. To the bottle was added 8 parts of Raney nickel catalyst and ½ part of sodium methoxide. The bottle was placed in a Parr hydrogenator and pressurized with hydrogen to 55 p.s.i. Shaking was started as the reaction mixture was heated to 110° C. As the pressure dropped to 30 p.s.i., additional hydrogen gas was introduced to maintain a pressure of 55 p.s.i. After a time interval of four hours, a total pressure drop of 52 p.s.i. had occurred and further drop in pressure did not occur. The excess pressure of the cooled system was released and a bluish liquid decanted away from the catalyst and fractionated. There was obtained 65 parts of a colorless material having a boiling point of 115° C. t 0.8 mm. Hg pressure. An infrared absorption scan failed to show the presence of the nitrile absorption band at 4.5 microns and did show the appearance of strong amine absorption bands at 2.1 microns and 6.25 microns, which was consisten with the expected structure, i.e., 3-methyl-3-(3-aminopropoxy)-1-trimethoxysilylbutene-1.

EXAMPLE 3

A room temperature vulcanizing adhesive was made by dissolving 2.6 parts of the 3-methyl-3-(3-aminopropoxy)-1-trimethoxysilylbutene-1 of Example 2 in 33 parts of an isoparaffin solvent having a boiling point between 150° and 180° C. and adding to this solution 97.4 parts of a silanol-stopped fluid of the formula:

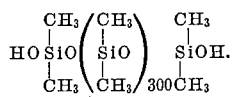

The mixture was stirred until it became a homogeneous solution. The solution formed was used to attach flat glass sheets at their abutting edges. After 3½ hours, the solvent had evaporated from the solution and the residue had cured to a tough, flexible, completely transparent material.

The adhesive was also used for joining metal to metal, paper to metal, metal to glass, and in various applications where a room temperature vulcanizable silicone adhesive would normally be used, and in every case gave corresponding or superior results to those obtained when using a conventional silicone adhesive based on an acetoxy cure system.

For comparison purposes, a similar adhesive system was prepared with the exception that a 3-methyl-3-(aminopropoxy) - 1 - trimethoxysilylbutene-1 was replaced with gamma - aminopropoxypropyltrimethoxysilane. This adhesive composition composition required a 4 to 5 day time period to effect a cure. When the 3-methyl-3-(3-aminopropoxy)-1-trimethoxysilylbutene-1 in the adhesive composition was replaced with gamma - aminopropyltrimethoxysilane, the composition required 3 days for a cure to take place. When the 3-methyl-3-(3-aminopropoxy)-1-trimethoxysilylbutene-1 was replaced with gamma-aminopropyltriethoxysilane, 12 to 14 days was required to effect a cure.

EXAMPLE 4

A textile treating solution was prepared by mixing 4 parts of the solution prepared by dissolving 2.6 parts of the 3-methyl-3-(3 - aminopropoxy) - 1 - trimethoxysilylbutene-1 of Example 3 in 33 parts of an isoparaffin solvent having a boiling point between 150° and 180° C. and adding to this solution 97.4 parts of a silanol-stopped fluid of the formula:

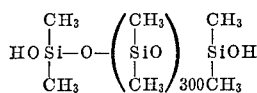

The mixture was stirred until it became a homogeneous solution. To this solution was added 45 parts of dichlorodifluoromethane, and a homogeneous solution was formed by agitating the mixture in a sealed container.

The solution was pressurized in an aerosol can and sprayed on cotton test fabric coupons. The test coupons were allowed to age for 24 hours and the water repellency tested by a standard test method. The coupons were then washed with a laundry detergent, dried and retested for water repellency. A significant improvement in water repellency was noted after the test coupons were washed as compared to the test coupons prior to washing.

EXAMPLE 5

To a reaction vessel was added 60 parts of a silanol chain-stopped polydimethylsiloxane of the formula:

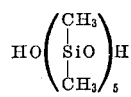

15 parts of 3-methyl-3-(3-aminopropoxy)-1-trimethyloxysilylbutene-1 and 25 parts of gamma-aminopropyltrimethoxysilane. This reaction mixture was thoroughly mixed and then 0.7 part water was added with stirring. This resulted in an organo-polysiloxane copolymer having a viscosity of about 150 centistokes containing about 4.5% by weight methoxy groups and in which 79.4 mole percent of the siloxane units were derived from the silanol chain-stopped polydimethylsiloxane, 5.9 mole percent of the siloxane units were derived from 3-methyl-3-(3-aminopropoxy)-1-trimethoxysilylbutene-1 and 14.7 mole percent of the siloxane units were derived from gamma-aminopropyltrimethoxysilane.

Seven parts of the copolymer described were converted to the partial aliphatic carboxylic acid salt by reaction with 0.35 part acetic acid to produce a product in which 41 mole percent of the amine groups were converted to the amine salt of acetic acid.

The amine salt was incorporated into a polish emulsion by forming a mixture of 2.62 parts of the salt, 2 parts of a methyl silicone oil having a viscosity of 10,000 centistrokes at 25° C., 2 parts of a sorbitan monooleate emulsifier, 20 parts mineral spirits, and 15 parts kerosene. After these components were thoroughly mixed, 50.3 parts of water was added with high shear agitation to form an emulsion. To this emulsion was then added 8.0 parts of aluminum silicate to produce a combination cleaner-polish emulsion.

As a control, the procedure set forth above was followed to produce a copolymer from 60 parts of the silanol chain-stopped polydimethylsiloxane and 40 parts of the gamma-aminopropropyltrimethoxysilane, but with none of the 3 - methyl - 3 - (3 - aminopropoxy) - 1 - trimethoxysilylbutene-1. Following the procedure outlined above, this material was converted to the partial acetic acid salt in which 41% of the amine groups had been converted to the acetic acid salt of the amine and then the salt was added to a polish formulation in the same manner as set forth above.

In order to compare the polish composition with the control, two sections of enameled automobile panels were polished side by side, one panel with each composition. The composition made from 3-methyl-3-(3-aminopropoxy)-1-trimethoxysilylbutene-1 had much better gloss than the control, was much easier to rub out than the control, and showed less streaking than the control.

Both compositions were evaluated for detergent resistance. The detergent resistant polish composition of the present invention was unaffected by 80 detergent washing cycles. Each detergent washing cycle involved washing the panel in a 3% solution of a conventional automobile washing detergent at a temperature of 120° F. The panels were then washed with water and air dried. When this same procedure was repeated with the control polish formulation described above, the surface film showed damage at the end of 30 cycles.

EXAMPLE 6

To a one-necked flask containing a solution of 751 parts propargyl alcohol, 710 parts acrylonitrile and 200 parts of toluene was added 130 parts of Rexyn 201, a polystyrene supported amine hydroxide ion-exchange resin of the formula:

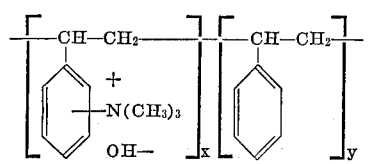

cross linked with 15% divinyl benzene where $x$ has an approximate value of over 1000 and $y$ has an approximate value of over 2000. The mixture was stirred at reflux by means of a magnetic stirrer. After a reaction time of 40 hours, gas chromatographic analysis indicated the reaction was essentially complete. The reaction mixture was filtered free of the base catalyst and fractionally distilled under vacuum. After removal of the toluene at 350 mm. Hg, the pressure was dropped to 0.9 mm. Hg where the product distilled over at 78° C. There was obtained 1314 parts of 3-(2-cyanoethoxy)-propyene-1 (90% of theory) whose purity by VPC was about 98+%.

Into a three-necked flask equipped with a magnetic stirrer, reflux condenser, thermometer and addition funnel was placed 54.5 parts of the 3-(2-cyanoethoxy)propyne-1 and 0.75 part of the platinum coordinate catalyst solution. To the addition funnel was charged 68.5 parts trichlorosilane. When the temperature reached 90° C., a small quantity of trichlorosilane was added. The reaction temperature climbed spontaneously to 175° C. The external heat source was removed. The remainder of the trichlorosilane was added at 150°–165° C. Following this, the reaction was kept 140° C. for 3 additional hours bp means of an external heat source. Analysis of the reaction at this stage showed complete utilization of the starting materials. Two closely spaced adducts were present, identified by IR trapping techniques as a 3-(2-cyanoethoxy)-1-trichlorosilylpropene-1 and 3-(2-cyanoethoxy)-2-trichlorosilylpropene-1. Their concentrations respectively were 80:20%. The reaction was flashed distilled and came over at 120°–125° C./0.7 mm. There was obtained 120 parts of mixture. Upon very careful fractionation using a spinning band column, the 2-adduct distilled over first B.P. 96°–97° C./0.6 mm. Its purity by VPC was 99+%. After an intermediate cut, the 1-adduct distilled over at 94° C./0.4 mm. Its purity by VPC was 99+%. IR data and NMR data supported the two proposed structures. An elemental analysis of the two products is set forth in the following table.

mula $(CH_3O)_3SiCH=CH_2CH_2OCH_2CH_2CN$ whose purity by VPC was 99+%. An IR and NMR spectrum confirmed the assigned structure.

Calculated (percent): C, 46.73; H, 7.41; N, 6.06; Si, 12.14. Found (percent): C, 47.12; H, 7.60; N, 6.20; Si, 12.22.

EXAMPLE 9

Into a 500 ml. pressure bottle was placed 50 parts of 3-(2-cyanoethoxy) - 1 - trimethoxysilylpropene - 1 and 20 parts of Raney nickel. The bottle was then placed in a Parr hydrogenator and pressurized with hydrogen to 50 p.s.i. Shaking was initiated and the reaction mixture was heated to 100° C. As the pressure dropped to 40 p.s.i., additional hydrogen was introduced to maintain a pressure of 50 p.s.i. After a time interval of 5 hours, a total pressure drop of 36 p.s.i. was recorded and further pressure drop did not occur. The excess pressure of the cooled system was released and the dark reddish brown liquid was decanted from the catalyst. Distillation yielded 22 parts of 3-(3-aminopropoxy)-1-trimethoxysilylpropene-1, B.P. 100°–101° C./0.3 mm. An IR scan of the product failed to indicate any nitrile absorption. The scan showed the appearance of amine absorption at 2.9 microns, 3.1 microns, and 6.2 microns. NMR showed the double bond remained intact in the final product.

EXAMPLE 10

To a reaction mixture containing 485 parts 1-hexyn-3-ol and 2 parts sodium methylate heated to 80° C. was added dropwise 265 parts acrylonitrile. The reaction was exothermic and the external heat source was removed. The reaction temperature was maintained at 80°–100° C. by rate of acrylonitrile addition. Following complete ad-

|  | Analysis | | | | | | | | | |
|---|---|---|---|---|---|---|---|---|---|---|
|  | Calculated | | | | | Found | | | | |
|  | C | H | N | Si | Cl | C | H | N | Si | Cl |
| $Cl_3SiC=\overset{H}{\underset{}{C}}CH_2OCH_2CH_2CN$ $\overset{H}{}$ | 29.46 | 3.30 | 5.73 | 11.49 | 43.48 | 29.59 | 3.44 | 5.43 | 11.51 | 43.63 |
| $Cl_3SiC-CH_2OCH_2CH_2CN$ <br> $\overset{\|\|}{CH_2}$ |  |  |  |  |  | 28.75 | 3.37 | 6.14 | 12.39 | 44.17 |

EXAMPLE 7

To a reaction mixture containing 24.5 parts of 3-(2-cyanoethoxy)-1-trichlorosilylpropene-1 was added slowly 45 parts methylorthoformate. A milky-white solution occurred upon initial contact. As the reaction heated up, the solution became clear and methyl chloride evolved. The reaction temperature was maintained at 45°–55° C. during the addition. Following complete addition, the reaction was brought to reflux at 55° C. and kept there for two hours. A VPC scan at this stage showed the reaction was complete. Upon fractionation, 20.4 parts of 3-(2-cyanoethoxy)-1-trimethoxysilylpropene-1 of the formula $$(CH_3O)_3SiCH=CHCH_2OCH_2CH_2CN$$

distilled over at 117° C./0.5 mm. Its purity was 99+%. An IR scan showed —$OCH_3$ absorption at 3.55 microns and 9.3 microns. An elemental analysis of the product is set forth in the following table.

Calculated (percent): C, 46.73; H, 7.41; N, 6.06; Si, 12.14. Found (percent): C, 47.22; H, 7.48; N, 5.93; Si, 12.21.

EXAMPLE 8

As in the above example, 11.6 parts of methylorthoformate was added slowly to 8 parts 3-(2-cyanoethoxy)-2-trichlorosilylpropene-1. A mild exotherm occurred, followed by gas evolution. Following complete addition, the reaction was heated by an external source for 2 hours at reflux followed by fractionation. The product distilled over at 97° C./0.1 mm. There was obtained 5 parts of 3-(2-cyanoethoxy)-2-trimethoxysilylpropene-1 of the fordition, the reaction was cooled, filtered and fractionated. There was obtained 609 parts of 3-(2-cyanoethoxy)hexyne-1 product B.P. 63° C./.15 mm.

There was added slowly at 140°–160° C. 66 parts of trichlorosilane to a solution of 75 parts 3-(2-cyanoethoxy) hexyne-1 and .76 of platinum coordination catalyst solution. The reaction exotherm was sufficient to maintain the reaction temperature. Following complete addition, external heat was applied and the reaction temperature was kept at 140° C. for 2 additional hours. A VPC scan at this time showed complete utilization of the starting material and the appearance of a single high boiling adduct. Upon fractionation, there was obtained 80 parts of 3-(2-cyanoethoxy)-1-trichlorosilylhexene-1, having a boiling point of 126°–127° C./0.75 mm. An IR scan and NMR analysis was consistent with the 1-adduct structure. An elemental analysis of the product is set forth in the following table.

Calculated (percent): C, 37.71; H, 4.92; N, 4.89; Si, 9.80; Cl, 37.10. Found (percent): C, 36.86; H, 5.05; N, 4.74; Si, 9.03; Cl, 37.98.

EXAMPLE 11

As in Example 7, 55 parts 3-(2-cyanoethoxy)-1-trichlorosilylhexene-1 was reacted slowly with 71 parts methylorthoformate. After complete addition, the reaction was refluxed for 3 hours and fractionated. The product distilled over at 120° C./0.4 mm. in almost quantitative amounts. An IR scan of the product, 3-(2-cyanoethoxy)-1-trimethoxysilylhexene-1, was consistant with the proposed structure.

EXAMPLE 12

To a reaction mixture containing 153 parts 3-(2-cyanoethoxy)hexyne-1 and 0.5 part platinum coordination catalyst, and heated under $N_2$ to 175°, was added dropwise 122 parts of trimethoxysilane. An exothermic reaction occurred and the temperature maintained between 180–200° C. by rate of silane addition. Upon complete silane addition, the reaction was kept at 175° for two hours, cooled and examined by VPC. Two adduct peaks were present, identified as the 2- and 1-adduct respectively. By trapping out samples in a Prepmaster VPC, then analyzing them by IR and NMR, a 2- and a 1-adduct were identified. Their ratios were 35:65% respectively. The 1-adduct was identical to that prepared in Example 11. The boiling point of the adduct mixture was 136° C./1. mm. Hg. The boiling point of the 2-adduct identified as 3-(2-cyanoethoxy)-2-trimethoxysilylhexene-1 was 98° C. at 0.1 mm. Hg.

What we claim as new and desire to secure by Letters Patent of the United States is:

1. A compound of the formula:

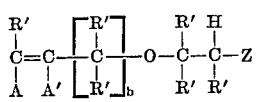

where Z is a radical selected from the group consisting of $CH_2NH_2$ and CN, X is a hydrolyzable radical selected from the group comprising lower alkoxy radicals, mononuclear aryloxy radicals, lower dialkylamino radicals, and lower aminoxy radicals; wherein A and A' are selected from the group consisting of $R_{3-a}X_aSi$— radicals and hydrogen radicals and must be different; R is a radical selected from the group consisting of lower alkyl radicals, cycloalkyl radicals, mononuclear and binuclear aryl radicals and mononuclear aryl lower alkyl radicals; R' is a radical selected from the group consisting of hydrogen, lower alkyl radicals, cycloalkyl radicals having 5 to 7 carbon atoms, mononuclear and binuclear aryl radicals and mononuclear aryl lower alkyl radicals; and in addition to the above, two R' radicals taken together with the carbon atom to which they are attached are a cycloalkyl chain, $a$ has a value of 0 to 3 and $b$ has a value of 1 to 4.

2. A compound of claim 1, further characterized by X being a hydrolyzable radical selected from the group consisting of lower alkoxy radicals and mononuclear aryloxy radicals, A and A' being selected from the group consisting of $R_{3-a}X_aSi$— radicals and hydrogen radicals and must be different, R being a lower alkyl radical; R' being a radical selected from the group consisting of hydrogen radicals, and lower alkyl radicals.

3. A compound of claim 1, further characterized by having the formula:

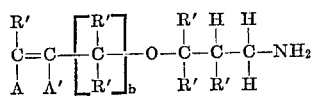

4. A compound of claim 1, further characterized by having the formula:

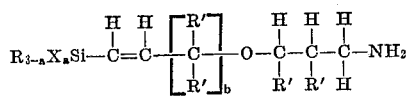

5. A compound of claim 3, further characterized by having the formula:

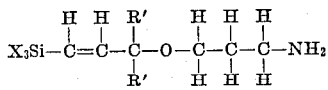

where R' is a radical selected from the group consisting of hydrogen and methyl radicals.

6. A compound of claim 1, further characterized by having the formula:

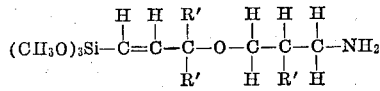

where R' is a radical selected from the group consisting of hydrogen and methyl radicals.

7. A compound of claim 1, further characterized by having the formula:

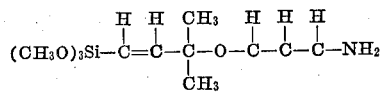

8. A compound of claim 1, further characterized by having the formula:

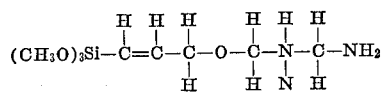

9. A compound of the formula:

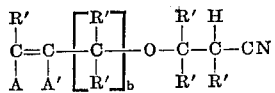

wherein A and A' are selected from the group consisting of $R_{3-a}X_aSi$— radicals and hydrogen radicals and must be different, X is a hydrolyzable radical selected from the group comprising halide, lower acyloxy, lower alkoxy, lower aminoxy, oximo aryloxy, isothiocyanato, isocyanato, isonitrile, lower dialkylamino, lower mercaptoalkyl, and lower dialkylphosphino; R is a radical selected from the group consisting of lower alkyl radicals, cycloalkyl radicals, mononuclear and binuclear aryl radicals, mononuclear aryl lower alkyl radicals, and halogenated derivatives thereof; R' is a radical selected from the group consisting of hydrogen, lower alkyl radicals having 1 to 7 carbons atoms, cycloalkyl radicals having 6 to 7 carbon atoms, mononuclear and binuclear aryl radicals, mononuclear aryl lower alkyl radicals, and in addition two R' radicals taken together with the carbon atom to which they are attached are a cycloalkyl chain, and halogenated derivatives of the above described R' radicals; $a$ has a value of 0 to 3 and $b$ has a value of 1 to 4.

10. A compound of claim 9, further characterized by X being a hydrolyzable radical selected from the group consisting of lower alkoxy radicals and mononuclear aryloxy radicals, A and A' being selected from the group consisting of $R_{3-a}X_aSi$— radicals and hydrogen radicals and being different; R being a lower alkyl radical; R' being a radical selected from the group consisting of hydrogen radicals and lower alkyl radicals.

11. A compound of claim 9, further characterized by having the formula:
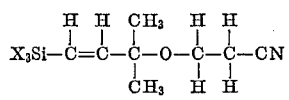
12. A compound of claim 9, further characterized by having the formula:
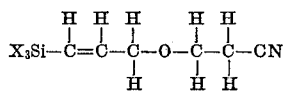
References Cited
UNITED STATES PATENTS
| | | | |
|---|---|---|---|
| 3,033,815 | 5/1962 | Pike et al. | 260—448.2 |
| 3,046,250 | 7/1962 | Plueddemann | 260—448.2 |
| 3,341,563 | 9/1967 | Buchheit et al. | 260—448.8 |
| 3,402,191 | 9/1968 | Morehouse | 260—448.2 |
JAMES E. POER, Primary Examiner
W. F. W. BELLAMY, Assistant Examiner
U.S. Cl. X.R.
260—448.2R, 448.2B, 448.2Q, 448.8R